United States Patent
Kawaguchi et al.

(10) Patent No.: US 11,774,672 B2
(45) Date of Patent: Oct. 3, 2023

(54) OPTICAL FIBER

(71) Applicant: SUMITOMO ELECTRIC INDUSTRIES, LTD., Osaka (JP)

(72) Inventors: Yuki Kawaguchi, Osaka (JP); Takemi Hasegawa, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 17/759,051

(22) PCT Filed: Mar. 16, 2021

(86) PCT No.: PCT/JP2021/010590
§ 371 (c)(1),
(2) Date: Jul. 19, 2022

(87) PCT Pub. No.: WO2021/187475
PCT Pub. Date: Sep. 23, 2021

(65) Prior Publication Data
US 2023/0037687 A1 Feb. 9, 2023

(30) Foreign Application Priority Data
Mar. 17, 2020 (JP) ................................. 2020-046648

(51) Int. Cl.
*G02B 6/036* (2006.01)
*G02B 6/028* (2006.01)

(52) U.S. Cl.
CPC ........ *G02B 6/03655* (2013.01); *G02B 6/0283* (2013.01)

(58) Field of Classification Search
CPC ................................................ G02B 6/03655
See application file for complete search history.

(56) References Cited

U.S. PATENT DOCUMENTS

2014/0161406 A1    6/2014 Kumano
2017/0192169 A1    7/2017 Kitamura et al.
(Continued)

FOREIGN PATENT DOCUMENTS

DE           4127868 A1    2/1993
JP      2013-035722 A    2/2013
(Continued)

OTHER PUBLICATIONS

International Search Report issued in Patent Application No. PCT/JP2021/010590 dated May 25, 2021.

*Primary Examiner* — Sung H Pak
(74) *Attorney, Agent, or Firm* — PEARNE & GORDON LLP

(57) ABSTRACT

An optical fiber includes a core, an inner cladding surrounding the core, and an outer cladding surrounding the inner cladding. A mean relative refractive index difference $\Delta 1$ of the core, a mean relative refractive index difference $\Delta 2$ of the inner cladding, and a mean relative refractive index difference $\Delta 3$ of the outer cladding satisfy a relationship of $\Delta 1 > \Delta 3 \geq \Delta 2$. A ratio $r2/r1$ of an inner cladding radius $r2$ to a core radius $r1$ is 4.5 or higher and 5.5 or lower. A minimum value $\Delta \min$ of a relative refractive index difference is $-0.030\%$ or higher and $-0.010\%$ or lower. A radius $r\min$ at which the relative refractive index difference is the minimum value $\Delta \min$ satisfies a relationship of $r1 < r\min < r2$. $(\Delta \min - \Delta(r1))/(r\min - r1)$ is $-0.002\%/\mu m$ or lower, where $\Delta(r1)$ denotes the relative refractive index difference with the core radius $r1$.

15 Claims, 4 Drawing Sheets

(56) References Cited

U.S. PATENT DOCUMENTS

2017/0269294 A1 9/2017 Endo et al.
2019/0119143 A1 4/2019 Bookbinder et al.

FOREIGN PATENT DOCUMENTS

| JP | 2017-026698 A | 2/2017 |
| WO | 2016/047749 A1 | 3/2016 |

OPTICAL FIBER

TECHNICAL FIELD

The present disclosure relates to an optical fiber. The present application is based upon and claims the benefit of the priority from Japanese patent application No. 2020-46648, filed on Mar. 17, 2020, which is hereby incorporated by reference in its entirety.

BACKGROUND ART

In ITU-T (International Telecommunication Union Telecommunication Standardization Sector) G.657, a standard for an optical fiber having excellent bending resistance characteristics is defined. In this standard, an optical fiber used under severe conditions with respect to bending in an access system such as FTTx (Fiber To The x) is assumed. For example, in ITU-T G.657 A1, upper limit values of bending loss at bending radii of 10 mm and 15 mm are defined. In ITU-T G.657 A2, upper limit values of bending loss at bending radii of 7.5 mm, 10 mm, and 15 mm are defined.

In order to improve bending resistance characteristics, a method of making a refractive index distribution having a depressed structure in a cladding is known. According to the depressed structure, since a refractive index difference between the core and the cladding can be increased while keeping a cutoff wavelength equal to or lower than a predetermined wavelength, the bending resistance characteristics are improved. Patent Literature 1 discloses a method in which chlorine (Cl) is added to an outer cladding part as one of methods for realizing a depressed structure.

Patent Literature 2 discloses a method of improving bending resistance characteristics by making a refractive index distribution so that a refractive index gradually decreases from a core to a cladding at a boundary between the core and the cladding.

CITATION LIST

Patent Literature

[Patent Literature 1] United States Patent Application, Publication No. 2019/0119143
[Patent Literature 2] Japanese Unexamined Patent Publication No. 2017-26698

SUMMARY OF INVENTION

An optical fiber according to one embodiment of the present disclosure includes a core, an inner cladding surrounding the core, and an outer cladding surrounding the inner cladding. A mean relative refractive index difference $\Delta 1$ of the core with respect to pure silica, a mean relative refractive index difference $\Delta 2$ of the inner cladding with respect to pure silica, and a mean relative refractive index difference $\Delta 3$ of the outer cladding with respect to pure silica satisfy a relationship of $\Delta 1 > \Delta 3 \geq \Delta 2$. A ratio $r2/r1$ of an inner cladding radius $r2$ to a core radius $r1$ is 4.5 or higher and 5.5 or lower. A minimum value $\Delta \min$ of a relative refractive index difference with respect to pure silica is $-0.030\%$ or higher and $-0.010\%$ or lower. A radius $r\min$ at which the relative refractive index difference is the minimum value $\Delta \min$ satisfies a relationship of $r1 < r\min < r2$. $(\Delta \min - \Delta(r1))/(r\min - r1)$ is $-0.002\%/\mu m$ or lower, where $\Delta(r1)$ denotes the relative refractive index difference with the core radius $r1$.

DESCRIPTION OF EMBODIMENTS

Technical Problem

Figure 1:
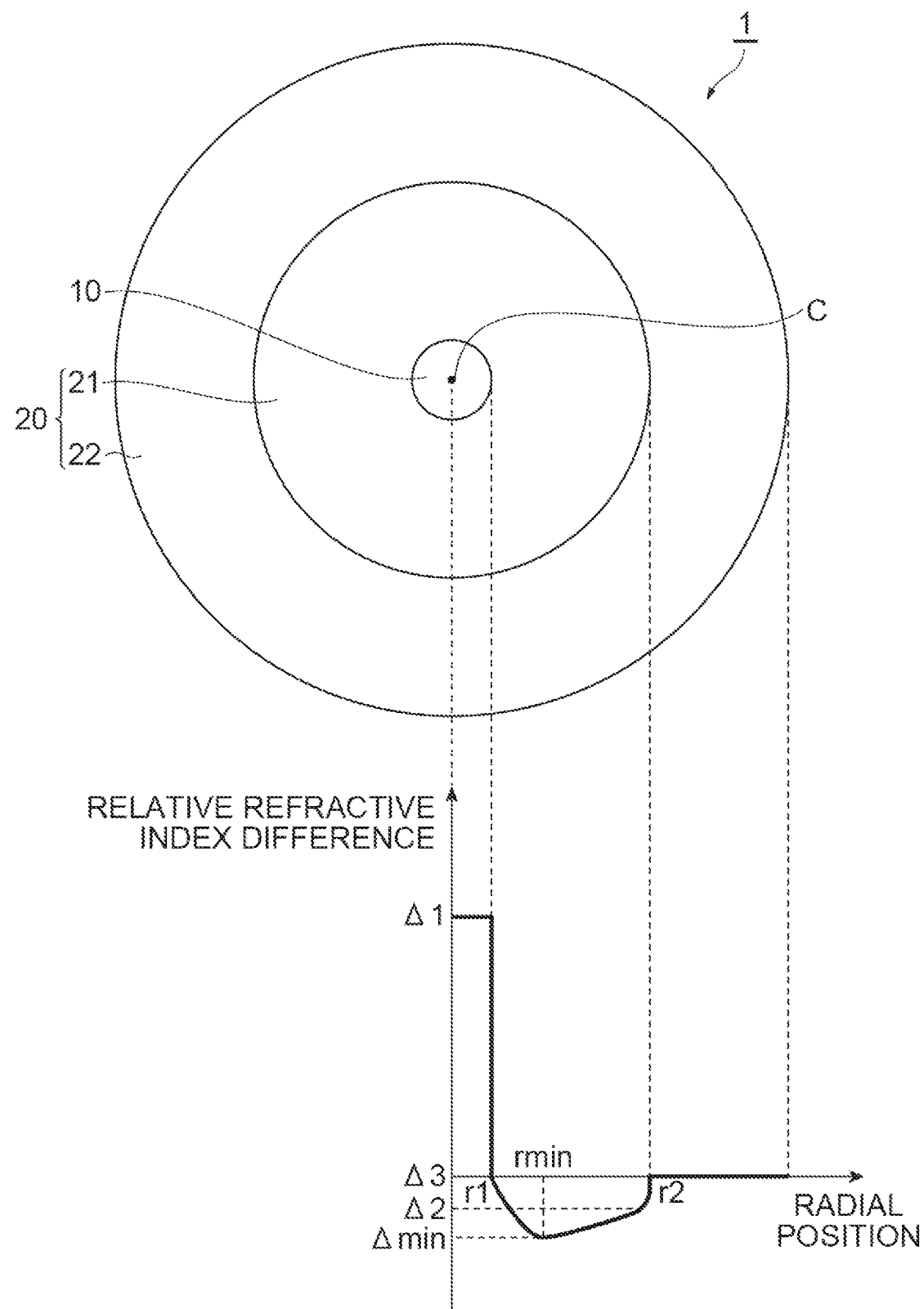
FIG. 1 is a view illustrating a cross section and a refractive index distribution of an optical fiber according to an embodiment.

From a viewpoint of improving bending resistance characteristics, it is necessary to make light waves be even more confined in the core. That is, in a depressed structure, in order to increase a refractive index difference between the core and the cladding, a large amount of dopant that changes a refractive index needs to be added to the core and the inner cladding. Also in the method disclosed in Patent Literature 1, a large amount of Cl needs to be added to the outer cladding part. Therefore, transmission loss is deteriorated.

The method described in Patent Literature 2 is substantially equivalent to increasing a core diameter, and an overlap between a power distribution of light and the dopant becomes large. Therefore, transmission loss is deteriorated.

Therefore, it is an objective of the present invention to provide an optical fiber in which low bending loss and low transmission loss can be achieved at the same time.

Advantageous Effects of Invention

According to the present disclosure, it is possible to provide an optical fiber in which low bending loss and low transmission loss can be achieved at the same time.

Solution to Problem

First, embodiments of the present disclosure will be listed and described. An optical fiber according to one embodiment includes a core, an inner cladding surrounding the core, and an outer cladding surrounding the inner cladding. A mean relative refractive index difference $\Delta 1$ of the core with respect to pure silica, a mean relative refractive index difference $\Delta 2$ of the inner cladding with respect to pure silica, and a mean relative refractive index difference $\Delta 3$ of the outer cladding with respect to pure silica satisfy a relationship of $\Delta 1 > \Delta 3 > \Delta 2$. A ratio $r2/r1$ of an inner cladding radius $r2$ to a core radius $r1$ is 4.5 or higher and 5.5 or lower. A minimum value $\Delta \min$ of a relative refractive index difference with respect to pure silica is $-0.030\%$ or higher and $-0.010\%$ or lower. A radius $r\min$ at which the relative refractive index difference is the minimum value $\Delta \min$ satisfies a relationship of $r1 < r\min < r2$. $(\Delta \min - \Delta(r1))/(r\min - r1)$ is $-0.002\%/\mu m$ or lower, where $\Delta(r1)$ denotes the relative refractive index difference at the core radius $r1$. As the refractive index described in the present disclosure, a value obtained as a moving average of measurement values of the refractive index at respective radii at, for example, 0.5 μm intervals can be used.

In the optical fiber according to the embodiment, since Δ1>Δ3≥Δ2, a relative refractive index difference between the core and the inner cladding can be provided. Since the ratio r2/r1 is 4.5 or higher, transmission loss can be suppressed. When the ratio r2/r1 is 5.5 or lower, bending loss can be suppressed. Since an inclination (hereinafter referred to as "first slope") of the refractive index distribution (Δmin−Δ(r1))/(rmin−r1) is −0.002%/μm or lower, bending loss can be suppressed. Therefore, low bending loss and low transmission loss can be achieved at the same time.

An inclination (hereinafter referred to as "second slope") Δmin/(rmin−r0) may be −0.002%/μm or lower in a case in which r0≥r1, where r0 denotes a radius at which the relative refractive index difference with respect to pure silica is zero.

The mean relative refractive index difference Δ2 may be −0.025% or higher and −0.010% or lower. In this case, it is easy to increase the relative refractive index difference between the core and the inner cladding.

A chlorine concentration averaged in the outer cladding may be 500 wt ppm or lower. In this case, foaming caused by Cl can be suppressed.

The mean relative refractive index difference Δ1 may be 0.35% or higher and 0.45% or lower. In this case, it is easy to increase the relative refractive index difference between the core and the inner cladding.

The radius rmin may be 7 μm or higher and 15 μm or lower. In this case, low bending loss and low transmission loss are easily achieved at the same time.

The core radius r1 may be 4 μm or higher and 5 μm or lower. In this case, the first slope (Δmin−Δ(r1))/(rmin−r1) or the second slope Δmin/(rmin−r0) tends to be −0.002%/μm or lower.

Detailed Description of Embodiments

Specific examples of an optical fiber of the present disclosure will be described below with reference to the drawings. Further, the present invention is not limited to these examples but is defined by the scope of the claims, and is intended to include meanings equivalent to the claims and all modifications within the scope. In the description of the drawings, the same elements will be denoted by the same reference signs, and duplicate description thereof will be omitted.

As described above, the depressed structure has a problem that transmission loss deteriorates due to a large amount of dopant added to a core and an inner cladding. Further, according to the experience and studies of the present inventors, in the method disclosed in Patent Literature 1, bubbles may be generated due to Cl. Therefore, there is also a problem that productivity is significantly reduced.

Also in the method disclosed in Patent Literature 2, when Ge or the like is added to the core, light is even more confined in the core, accordingly an overlap between a Ge distribution and a power distribution of light increases, and thus transmission loss is deteriorated.

FIG. 1 is a view illustrating a cross section and a refractive index distribution of an optical fiber according to an embodiment. As illustrated in FIG. 1, an optical fiber 1 of the present embodiment includes a core 10 and a cladding 20 that surrounds the core 10. The cross-sectional view of FIG. 1 represents a cross section perpendicular to a central axis C of the optical fiber 1. In the refractive index distribution diagram of FIG. 1, the horizontal axis represents a radial position of the optical fiber 1, and the vertical axis represents a relative refractive index difference of the optical fiber 1 with respect to pure silica ($SiO_2$).

The core 10 is formed of silica glass containing Ge. The cladding 20 includes an inner cladding 21 that surrounds the core 10 and an outer cladding 22 that surrounds the inner cladding 21. The inner cladding 21 is formed of silica glass containing fluorine (F). The outer cladding 22 is formed of silica glass containing substantially no dopant. A chlorine (Cl) concentration averaged in the outer cladding 22 is 500 wtppm or lower in terms of mass fraction.

An outer diameter (diameter) of the cladding 20 is equal to an outer diameter (diameter) of the outer cladding 22, and is, for example, 124 μm or higher and 126 μm or lower. A radius of the core 10, that is, a core radius r1, is, for example, 4 μm or higher and 5 μm or lower. A radius of the inner cladding 21, that is, an inner cladding radius r2 is, for example, 18 μm or higher and 28 μm or lower.

A mean relative refractive index difference Δ1 of the core 10 with respect to pure silica, a mean relative refractive index difference Δ2 of the inner cladding 21 with respect to pure silica, and a mean relative refractive index difference Δ3 of the outer cladding 22 with respect to pure silica satisfy a relationship of Δ1>Δ3 ≥Δ2. A relationship of Δ1>Δ3≥Δ2 may also be satisfied. The mean relative refractive index difference Δ1 is, for example, 0.35% or higher and 0.45% or lower. The mean relative refractive index difference Δ2 is, for example, −0.025% or higher and −0.010% or lower. The mean relative refractive index difference Δ3 is, for example, −0.015% or higher and 0.035% or lower, preferably −0.010% or higher and 0.010% or lower, and more preferably −0.005% or higher and 0.005% or lower. In this way, when the inner cladding 21 is provided as a region having a low refractive index between the core 10 and the outer cladding 22, light waves in a basic mode can be even more confined while maintaining a desired cutoff wavelength. A boundary between the core 10 and the inner cladding 21 and a boundary between the inner cladding 21 and the outer cladding 22 are detected by measuring the refractive index distribution. For example, when a measurement result of a refractive index in a radial direction is differentiated with respect to the radial direction, a position in which a differential value thereof is equal to or lower than a certain value can be defined as a boundary between the core 10 and the inner cladding 21, and a position in which a differential value thereof is equal to or higher than a certain value can be defined as a boundary between the inner cladding 21 and the outer cladding 22.

The relative refractive index difference of the optical fiber 1 with respect to pure silica is a minimum value Δmin in the inner cladding 21. The minimum value Δmin is −0.030% or higher and −0.010% or lower. A radius rmin at which the relative refractive index difference of the optical fiber 1 with respect to pure silica is the minimum value Δmin is, for example, 7 μm or higher and 15 μm or lower. Also, r1<rmin<r2 is established.

In order to make light waves be even more confined, it is necessary to increase a difference between Δ1 and Δ2. That is, it is necessary to increase Δ1 or decrease Δ2. Generally, $GeO_2$ is used as an up-dopant to increase Δ1, and F is used as a down-dopant to decrease Δ2. However, in either case, increase in Rayleigh scattering loss results in an increase in transmission loss.

Therefore, in the optical fiber 1, a concentration of F is lowered in an inner portion (in the vicinity of the core 10) of a depressed portion (the inner cladding 21). Thereby, since the Rayleigh scattering is suppressed, increase in transmission loss is reduced. Also, in the inner cladding 21 in the vicinity of the core 10, when the concentration of F is low, the refractive index distribution has an inclination as illustrated in FIG. 1.

Figure 2:
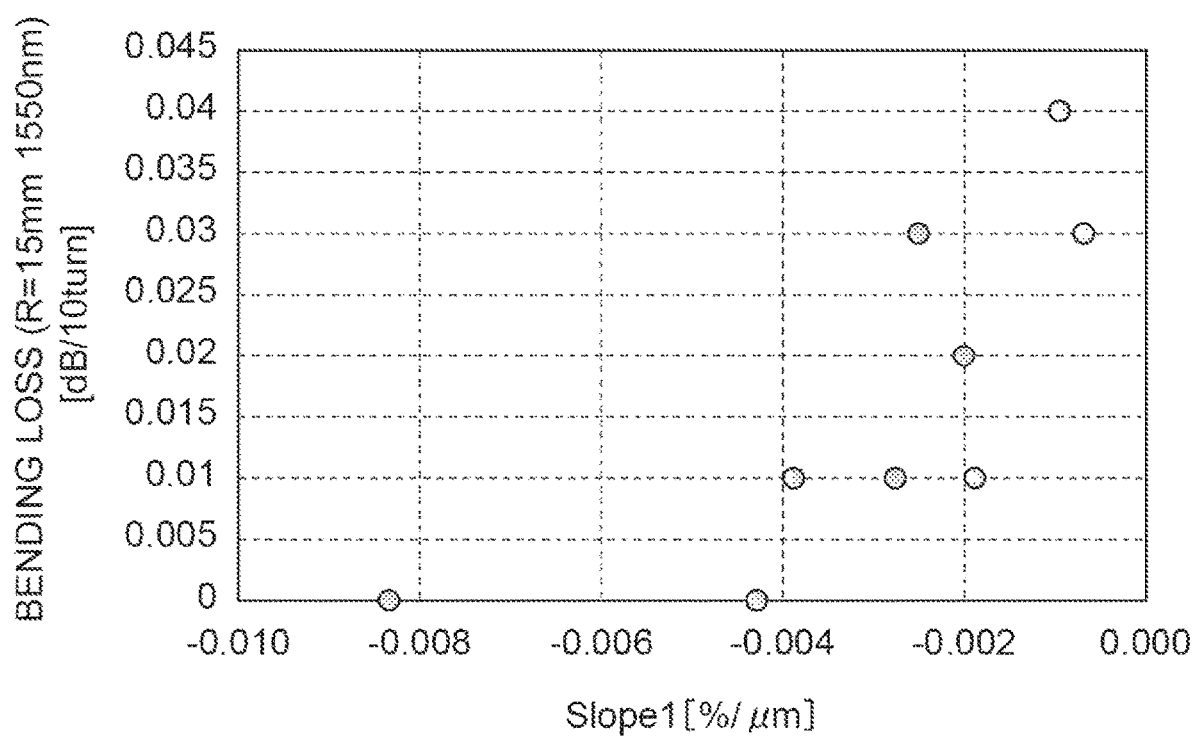
FIG. 2 is a graph showing a relationship between a first slope of a relative refractive index difference and bending loss.

FIG. 2 is a graph showing a relationship between a first slope of the relative refractive index difference and bending loss. In FIG. 2, the horizontal axis represents the first slope (slope 1), and the vertical axis represents the bending loss. Here, the "first slope" refers to an inclination of the refractive index distribution of the inner cladding 21 in the vicinity of the core 10 and, specifically, is defined as an inclination of the refractive index distribution in a radius (radial position) between r1 and rmin. That is, when the relative refractive index difference of the optical fiber 1 with respect to pure silica in the core radius r1 is $\Delta(r1)$, the first slope is represented by $(\Delta min-\Delta(r1))/(rmin-r1)$. Also, the "bending loss" here represents increased loss at a wavelength of 1550 nm when the optical fiber is wound 10 turns around a mandrel having a diameter of 15 mm.

Figure 3:
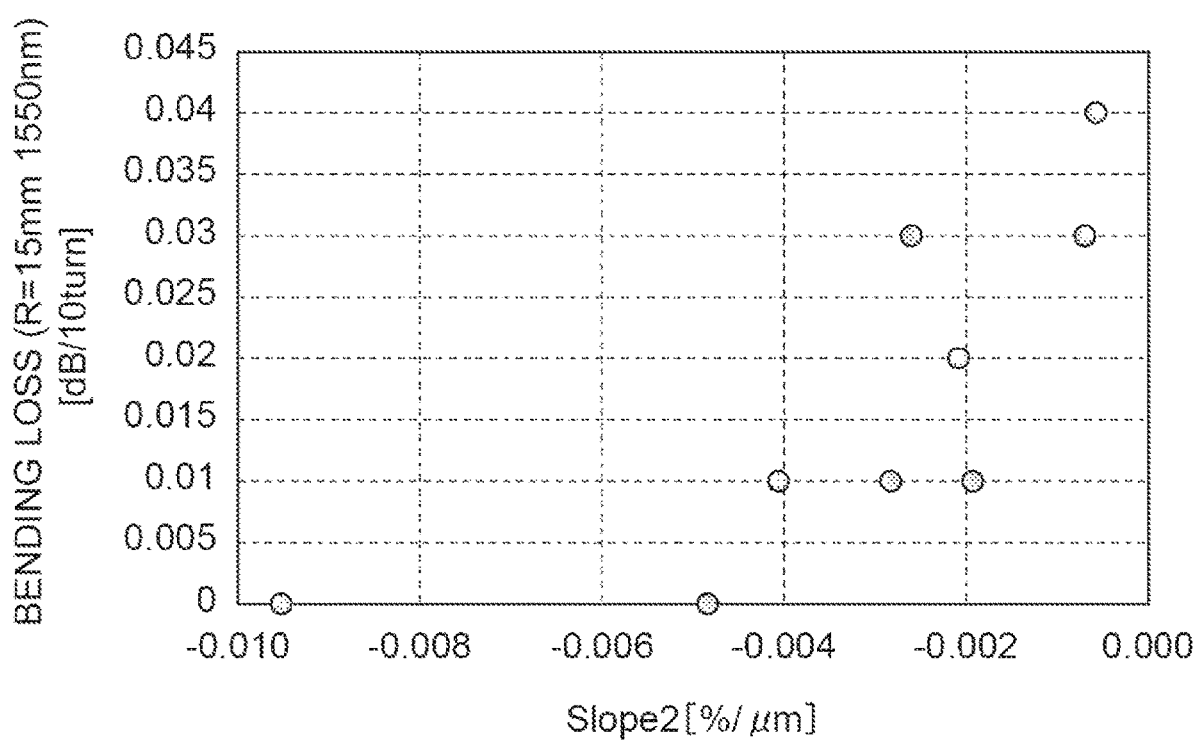
FIG. 3 is a graph showing a relationship between a second slope of the relative refractive index difference and bending loss.

FIG. 3 is a graph showing a relationship between a second slope of the relative refractive index difference and bending loss. In FIG. 3, the horizontal axis represents the second slope (slope 2), and the vertical axis represents the bending loss. Here, the second slope is also an inclination of the refractive index distribution of the inner cladding 21 in the vicinity of the core 10 and, specifically, is defined as an inclination of the refractive index distribution in a radius (radial position) between r0, at which the relative refractive index difference with respect to pure silica is zero, and rmin. That is, the second slope is represented by $\Delta min/(rmin-r0)$.

Since a spread of an electromagnetic field distribution at the time of bending the optical fiber can be suppressed when the inclination of the refractive index distribution is appropriately designed, bending resistance characteristics can be maintained. As illustrated in FIGS. 2 and 3, when the first slope and the second slope are $-0.002\%/\mu m$ or lower, the bending loss is maintained at 0.03 dB/10 turn or lower. Therefore, in the optical fiber 1, the inclination is set to $-0.002\%/\mu m$ or lower. Thereby, the bending loss is suppressed.

As described above, while the inner cladding 21 is formed of the silica glass containing F, the outer cladding 22 is formed of the silica glass containing substantially no dopant. Therefore, a large stress difference occurs at the boundary between the inner cladding 21 and the outer cladding 22. Thereby, although the transmission loss deteriorates, the deterioration of the transmission loss can be suppressed by designing so that the boundary between the inner cladding 21 and the outer cladding 22 is far from the central axis C.

Figure 4:
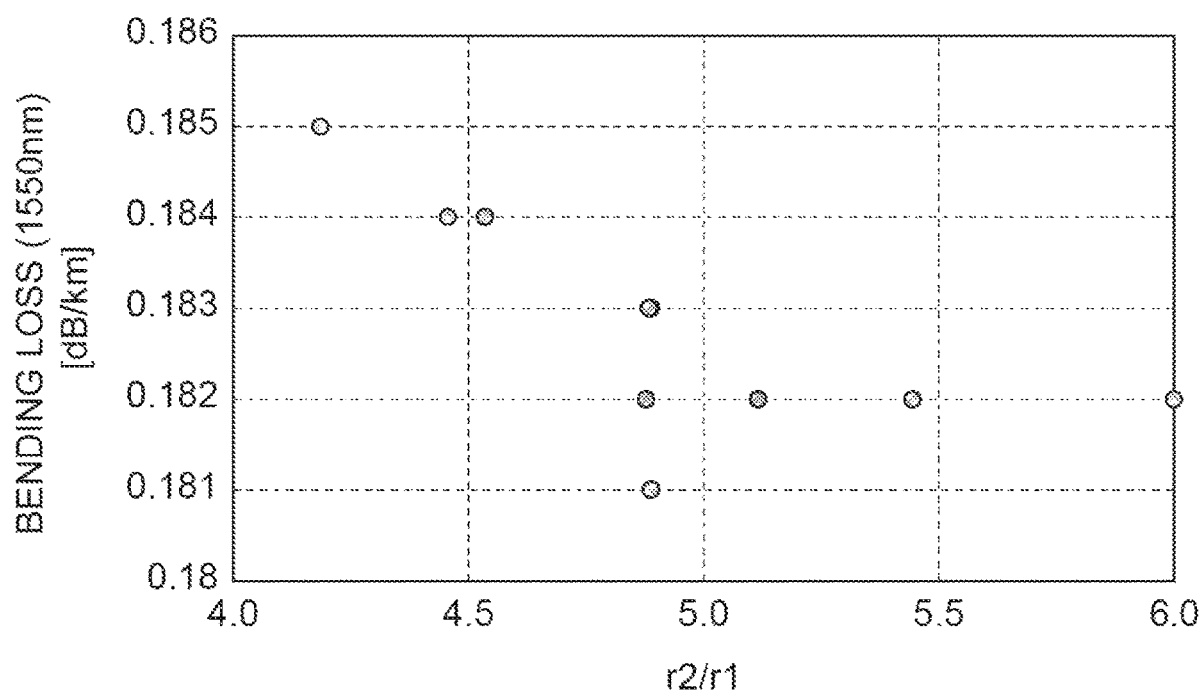
FIG. 4 is a graph showing a relationship between a ratio of an inner cladding radius to a core radius and a transmission loss.

FIG. 4 is a graph showing a relationship between a ratio of the inner cladding radius to the core radius and a transmission loss. In FIG. 4, the horizontal axis represents a ratio r2/r1 of the inner cladding radius to the core radius, and the vertical axis represents transmission loss at a wavelength of 1550 nm. That is, FIG. 4 is a graph showing ratio r2/r1 dependence of the transmission loss at the wavelength of 1550 nm. As illustrated in FIG. 4, the transmission loss can be made to be 0.184 dB/km or lower by setting the ratio r2/r1 to 4.5 or higher. Therefore, in the optical fiber 1, the ratio r2/r1 is set to 4.5 or higher and 5.5 or lower. As a result, transmission loss is suppressed.

From the above, according to the optical fiber 1, low bending loss and low transmission loss can be achieved at the same time. Also, a Cl concentration averaged in the outer cladding 22 is 500 wtppm or lower. Therefore, foaming caused by Cl can be suppressed in the optical fiber 1. Therefore, productivity can be improved.

EXAMPLE

Hereinafter, the present disclosure will be described in more detail by showing results of evaluation tests using examples and comparative examples according to the present disclosure. Further, the present disclosure is not limited to these examples.

Table 1 shows refractive index parameters, cutoff wavelengths $\lambda cc$, and mode field diameters (MFD 1.31) at 1310 nm of the optical fibers according to the examples and the comparative examples.

TABLE 1

| No. | Δ1 (%) | Δ2 (%) | Δ3 (%) | Δmin (%) | Δ1-Δ2 (%) | r1 (μm) | r0 (μm) |
|---|---|---|---|---|---|---|---|
| 1 | 0.45 | −0.010 | 0.000 | −0.016 | 0.46 | 4.5 | 4.7 |
| 2 | 0.47 | −0.015 | −0.001 | −0.020 | 0.48 | 4.6 | 4.9 |
| 3 | 0.39 | −0.011 | 0.000 | −0.018 | 0.40 | 4.1 | 4.3 |
| 4 | 0.44 | −0.012 | −0.001 | −0.015 | 0.45 | 4.5 | 4.8 |
| 5 | 0.43 | −0.012 | 0.000 | −0.016 | 0.44 | 4.3 | 4.5 |
| 6 | 0.42 | −0.020 | −0.004 | −0.024 | 0.44 | 4.3 | 4.5 |
| 7 | 0.42 | −0.023 | −0.003 | −0.026 | 0.44 | 4.3 | 4.6 |
| 8 | 0.45 | −0.010 | 0.000 | −0.015 | 0.46 | 4.5 | 4.9 |
| 9 | 0.38 | −0.012 | −0.002 | −0.018 | 0.39 | 4.8 | 5.3 |
| 10 | 0.41 | −0.011 | −0.001 | −0.013 | 0.42 | 4.8 | 5 |
| 11 | 0.35 | −0.010 | 0.000 | −0.014 | 0.36 | 4.6 | 4.8 |
| 12 | 0.38 | −0.011 | −0.001 | −0.015 | 0.39 | 4.8 | 4.9 |
| 13 | 0.38 | −0.014 | −0.002 | −0.018 | 0.39 | 4.7 | 4.9 |
| 14 | 0.36 | −0.022 | −0.002 | −0.025 | 0.38 | 4.8 | 5.4 |
| 15 | 0.37 | −0.018 | −0.001 | −0.022 | 0.39 | 4.7 | 4.9 |
| 16 | 0.38 | −0.011 | 0.000 | −0.017 | 0.39 | 4.7 | 5.1 |
| 17 | 0.45 | −0.009 | 0.000 | −0.012 | 0.46 | 4.5 | 4.8 |
| 18 | 0.45 | −0.008 | 0.000 | −0.010 | 0.46 | 4.5 | 4.7 |
| 19 | 0.46 | −0.012 | 0.000 | −0.016 | 0.47 | 4.3 | 4.5 |
| 20 | 0.44 | −0.012 | −0.001 | −0.015 | 0.45 | 4.5 | 4.7 |
| 21 | 0.44 | −0.012 | −0.001 | −0.015 | 0.45 | 4.5 | 4.8 |
| 22 | 0.35 | −0.010 | −0.001 | −0.018 | 0.36 | 4.6 | 4.9 |
| 23 | 0.38 | −0.010 | 0.000 | −0.015 | 0.39 | 4.8 | 5.2 |
| 24 | 0.39 | −0.008 | 0.000 | −0.017 | 0.40 | 4.8 | 5.5 |

| No. | rmin (μm) | r2/r1 | Slope 1 (%/μm) | Slope 2 (%/μm) | λcc (nm) | MFD 1.31 (μm) |
|---|---|---|---|---|---|---|
| 1 | 13 | 4.9 | −0.002 | −0.002 | 1228 | 8.7 |
| 2 | 7 | 4.5 | −0.008 | −0.010 | 1251 | 8.6 |
| 3 | 11 | 4.9 | −0.003 | −0.003 | 1201 | 8.8 |
| 4 | 12 | 5.4 | −0.002 | −0.002 | 1231 | 8.8 |
| 5 | 12 | 4.5 | −0.002 | −0.002 | 1189 | 8.6 |
| 6 | 13 | 4.9 | −0.003 | −0.003 | 1220 | 8.6 |
| 7 | 11 | 5.1 | −0.004 | −0.004 | 1215 | 8.6 |
| 8 | 8 | 4.9 | −0.004 | −0.005 | 1235 | 8.6 |
| 9 | 14 | 5.0 | −0.002 | −0.002 | 1223 | 9.2 |
| 10 | 10 | 5.0 | −0.003 | −0.003 | 1249 | 9.1 |
| 11 | 9 | 4.6 | −0.003 | −0.003 | 1211 | 9.2 |
| 12 | 11 | 5.5 | −0.002 | −0.002 | 1255 | 9.1 |
| 13 | 9 | 4.5 | −0.004 | −0.004 | 1178 | 9 |
| 14 | 11 | 4.8 | −0.004 | −0.004 | 1219 | 9.2 |
| 15 | 11 | 4.9 | −0.003 | −0.004 | 1230 | 9.1 |
| 16 | 9 | 4.9 | −0.004 | −0.004 | 1221 | 9 |
| 17 | 22 | 4.9 | −0.001 | −0.001 | 1207 | 8.7 |
| 18 | 22 | 4.9 | −0.001 | −0.001 | 1202 | 8.7 |
| 19 | 18 | 4.2 | −0.003 | −0.001 | 1229 | 8.5 |
| 20 | 27 | 6.0 | −0.003 | −0.001 | 1184 | 8.8 |
| 21 | 28 | 6.2 | −0.003 | −0.001 | 1182 | 8.7 |
| 22 | 14 | 6.0 | −0.002 | −0.002 | 1155 | 9.2 |
| 23 | 15 | 5.2 | −0.001 | −0.002 | 1158 | 9.2 |
| 24 | 14 | 5.2 | −0.002 | −0.002 | 1201 | 9.2 |

Table 2 shows transmission loss ($\alpha 1.55$) at the wavelength of 1550 nm and bending loss of the optical fibers according to the examples and the comparative examples. Here, the bending loss refers to increased loss at a wavelength of 1550 nm and a wavelength of 1625 nm when the optical fiber is wound once around a mandrel having a diameter of 7.5 mm, wound once around a mandrel having a diameter of 10 mm, and wound 10 turns around a mandrel having a diameter of 15 mm.

TABLE 2

| No. | α1.55 (dB/km) | Bending loss (wavelength 1550 nm) | | | Bending loss (wavelength 1625 nm) | | |
|---|---|---|---|---|---|---|---|
| | | R = 7.5 mm (dB/turn) | R = 10 mm (dB/turn) | R = 15 mm (dB/turn) | R = 7.5 mm (dB/turn) | R = 10 mm (dB/turn) | R = 15 mm (dB/turn) |
| 1 | 0.183 | 0.23 | 0.07 | 0.01 | 0.42 | 0.14 | 0.02 |
| 2 | 0.184 | 0.06 | 0.03 | 0.00 | 0.21 | 0.11 | 0.01 |
| 3 | 0.182 | 0.35 | 0.09 | 0.03 | 0.94 | 0.21 | 0.08 |
| 4 | 0.182 | 0.30 | 0.04 | 0.02 | 0.67 | 0.14 | 0.06 |
| 5 | 0.184 | 0.16 | 0.08 | 0.02 | 0.39 | 0.19 | 0.05 |
| 6 | 0.183 | 0.18 | 0.06 | 0.01 | 0.31 | 0.13 | 0.05 |
| 7 | 0.182 | 0.16 | 0.04 | 0.01 | 0.37 | 0.09 | 0.03 |
| 8 | 0.183 | 0.11 | 0.06 | 0.00 | 0.20 | 0.12 | 0.01 |
| 9 | 0.18 | 0.84 | 0.11 | 0.04 | 1.93 | 0.27 | 0.23 |
| 10 | 0.181 | 0.54 | 0.09 | 0.03 | 1.30 | 0.18 | 0.08 |
| 11 | 0.179 | 0.91 | 0.14 | 0.05 | 0.26 | 0.25 | 0.15 |
| 12 | 0.179 | 0.66 | 0.07 | 0.04 | 1.40 | 0.18 | 0.09 |
| 13 | 0.182 | 0.73 | 0.09 | 0.03 | 1.60 | 0.22 | 0.10 |
| 14 | 0.179 | 1.60 | 0.17 | 0.08 | 2.40 | 0.38 | 0.40 |
| 15 | 0.18 | 0.77 | 0.08 | 0.04 | 1.50 | 0.21 | 0.12 |
| 16 | 0.18 | 0.63 | 0.05 | 0.05 | 1.10 | 0.15 | 0.11 |
| 17 | 0.181 | 0.41 | 0.07 | 0.03 | 0.74 | 0.25 | 0.12 |
| 18 | 0.181 | 0.45 | 0.09 | 0.04 | 0.82 | 0.26 | 0.14 |
| 19 | 0.185 | 0.14 | 0.04 | 0.00 | 0.22 | 0.16 | 0.02 |
| 20 | 0.182 | 1.10 | 0.09 | 0.05 | 1.50 | 0.18 | 0.24 |
| 21 | 0.181 | 0.87 | 0.07 | 0.06 | 1.70 | 0.16 | 0.22 |
| 22 | 0.179 | 6.53 | 0.24 | 0.19 | 6.02 | 0.48 | 1.64 |
| 23 | 0.181 | 4.40 | 0.20 | 0.14 | 4.46 | 0.42 | 1.06 |
| 24 | 0.18 | 2.26 | 0.15 | 0.09 | 2.70 | 0.33 | 0.51 |

Experimental examples 1 to 16 and 24 are examples. Experimental Examples 17 to 23 are comparative examples. In experimental examples 1 to 8 according to the examples and experimental examples 17 to 21 according to the comparative examples, the MFD at the wavelength of 1310 nm is included in a range of 8.5 μm or higher and 8.8 μm or lower. In experimental examples 9 to 16 and 24 according to the examples and experimental examples 22 and 23 according to the comparative examples, the MFD at the wavelength of 1310 nm is included in a range of 9 μm or higher and 9.2 μm or lower.

In the optical fibers according to experimental examples 1 to 16 and 24, the ratio r2/r1 is all included in a range of 4.5 or higher and 5.5 or lower. On the other hand, in the optical fiber according to experimental example 19, the ratio r2/r1 is lower than 4.5, and the transmission loss at the wavelength of 1550 nm is as high as 0.185 dB/km. Also, in the optical fibers according to experimental examples 20 to 22, the ratio r2/r1 is all higher than 5.5, and a value of the bending loss is high. Generally, since bending loss becomes high when the MFD increases, here, the bending loss will be compared between optical fibers having approximately the same MFD at the wavelength of 1310 nm. That is, in the optical fibers according to experimental examples 20 and 21, values of the bending loss are substantially high compared to those of the optical fibers according to experimental examples 1 to 8. In the optical fiber according to experimental example 22, a value of the bending loss is high compared to those of the optical fibers according to experimental examples 9 to 16 and 24.

In the optical fibers according to experimental examples 1 to 16 and 24, the first slope $(\Delta\text{min}-\Delta(r1))/(r\text{min}-r1)$ and the second slope $\Delta\text{min}/(r\text{min}-r0)$ are both −0.002%/μm or lower. In the optical fibers according to experimental examples 17, 18 and 23, the first slope $(\Delta\text{min}-\Delta(r1))/(r\text{min}-r1)$ is all −0.001%/μm. Also, in the optical fibers according to experimental examples 17 to 21, the second slope $\Delta\text{min}/(r\text{min}-r0)$ is all −0.001%/μm. Here again, bending loss will be compared between optical fibers having approximately the same MFD. In the optical fibers according to experimental examples 17 and 18, a value of the bending loss is substantially high compared to those of the optical fibers according to experimental examples 1 to 8. Also, in the optical fiber according to experimental example 23, a value of the bending loss is high compared to those of the optical fibers according to experimental examples 9 to 16 and 24.

In the optical fibers according to experimental examples 1 to 16 and 24, the transmission loss at the wavelength of 1550 nm was set to 0.184 dB/km or lower (α1.55≤0.184 dB/km) while satisfying the bending loss specified in ITU-T G.657 A1 or A2, and thus low bending loss and low transmission loss could be achieved at the same time.

REFERENCE SIGNS LIST

1 Optical fiber
10 Core
20 Cladding
21 Inner cladding
22 Outer cladding
C Central axis

What is claimed is:
1. An optical fiber comprising:
a core;
an inner cladding surrounding the core; and
an outer cladding surrounding the inner cladding, wherein
a mean relative refractive index difference Δ1 of the core with respect to pure silica, a mean relative refractive index difference Δ2 of the inner cladding with respect to pure silica, and a mean relative refractive index difference Δ3 of the outer cladding with respect to pure silica satisfy a relationship of Δ1>Δ3≥Δ2,
a ratio r2/r1 of an inner cladding radius r2 to a core radius r1 is 4.5 or higher and 5.5 or lower,
a minimum value Δmin of a relative refractive index difference with respect to pure silica is −0.030% or higher and −0.010% or lower,
a radius rmin at which the relative refractive index difference is the minimum value Δmin satisfies a relationship of r1<rmin<r2, and
$(\Delta\text{min}-\Delta(r1))/(r\text{min}-r1)$ is −0.002%/μm or lower, where Δ(r1) denotes the relative refractive index difference at the core radius r1.
2. The optical fiber according to claim 1, wherein r0≥r1 and $\Delta\text{min}/(r\text{min}-r0)$ is −0.002%/μm or lower, where r0 denotes a radius at which the relative refractive index difference with respect to pure silica is zero.
3. The optical fiber according to claim 1, wherein the mean relative refractive index difference Δ2 is −0.025% or higher and −0.010% or lower.
4. The optical fiber according to claim 1, wherein a chlorine concentration averaged in the outer cladding is 500 wtppm or lower.
5. The optical fiber according to claim 1, wherein the mean relative refractive index difference Δ1 is 0.35% or higher and 0.45% or lower.
6. The optical fiber according to claim 1, wherein the radius rmin is 7 μm or higher and 15 μm or lower.
7. The optical fiber according to claim 1, wherein the core radius r1 is 4 μm or higher and μm or lower.

8. The optical fiber according to claim 1, wherein the mean relative refractive index difference Δ1, the mean relative refractive index difference Δ2, and the mean relative refractive index difference Δ3 satisfy a relationship of Δ1>Δ43>Δ2.

9. The optical fiber according to claim 1, wherein the mean relative refractive index difference Δ3 is −0.015% or higher and 0.035% or lower.

10. The optical fiber according to claim 1, wherein increased loss of the optical fiber which has been wound 10 turns around a mandrel having a diameter of 15 mm is 0.03 dB/10 turn or lower at a wavelength of 1550 nm.

11. The optical fiber according to claim 1, wherein a transmission loss at a wavelength of 1550 nm is 0.184 dB/km or lower.

12. The optical fiber according to claim 1, wherein the inner cladding radius r2 is 18 μm or higher and 28 μm or lower.

13. The optical fiber according to claim 1, wherein the inner cladding is formed of silica glass containing fluorine.

14. The optical fiber according to claim 1, wherein a mode field diameter at a wavelength of 1310 nm is 8.5 μm or higher and 8.8 μm or lower.

15. The optical fiber according to claim 1, wherein a mode field diameter at a wavelength of 1310 nm is 9 μm or higher and 9.2 μm or lower.

* * * * *